(12) United States Patent
Lee et al.

(10) Patent No.: US 9,842,294 B2
(45) Date of Patent: Dec. 12, 2017

(54) INTERACTIVE CONSTRAINT SOLVER

(71) Applicant: Oracle International Corporation, Redwood Shores, CA (US)

(72) Inventors: David J. Lee, Merrimack, NH (US); Steven Huberman, Carlisle, MA (US)

(73) Assignee: Oracle International Corporation, Redwood Shores, CA (US)

( * ) Notice: Subject to any disclaimer, the term of this patent is extended or adjusted under 35 U.S.C. 154(b) by 205 days.

(21) Appl. No.: 14/692,602

(22) Filed: Apr. 21, 2015

(65) Prior Publication Data
US 2016/0086081 A1    Mar. 24, 2016

Related U.S. Application Data

(60) Provisional application No. 62/054,260, filed on Sep. 23, 2014.

(51) Int. Cl.
*G06N 5/00* (2006.01)
*G06F 1/00* (2006.01)

(52) U.S. Cl.
CPC ..................... *G06N 5/00* (2013.01)

(58) Field of Classification Search
CPC ............ G06N 5/02; G06N 5/04; G06N 5/048; G06N 7/005
See application file for complete search history.

(56) References Cited

U.S. PATENT DOCUMENTS

| | | |
|---|---|---|
| 7,313,532 B2 | 12/2007 | Mariamova et al. |
| 7,478,419 B2 | 1/2009 | Anderson et al. |
| 8,065,255 B2 | 11/2011 | Colena et al. |
| 8,126,834 B2 | 2/2012 | Chen et al. |
| 8,165,980 B2 | 4/2012 | Chen et al. |
| 8,165,981 B2 | 4/2012 | Colena et al. |
| 8,301,582 B2 | 10/2012 | Huberman et al. |
| 8,447,716 B2 | 5/2013 | Bagley et al. |
| 8,504,501 B2 | 8/2013 | Colena et al. |
| 8,645,302 B2 | 2/2014 | Chen et al. |
| 8,751,425 B2 | 6/2014 | Bagley et al. |
| 9,588,819 B2 | 3/2017 | Kadioglu et al. |

(Continued)

OTHER PUBLICATIONS

Zhu et al., "Meeting Scheduling System Based on Open Constraint Programming" Banks Pidduck et al. (Eds.): CAISE 2002, LNCS 2348, 5 pages, 2002.Springer-Verlag Berlin Heidelberg 2002.

(Continued)

*Primary Examiner* — Stanley K Hill
*Assistant Examiner* — Kalpana Bharadwaj
(74) *Attorney, Agent, or Firm* — Hickman Palermo Becker Bingham LLP (57) ABSTRACT

Constraint programming is used to solve problems that have many variables and that have many possible solutions. An interactive constraint solver application provides additional information to a user if a conflict arises between two choice-constraints so that the additional information can be used to resolve the conflict according to a model-constraint set up by an application developer. The additional information identifies a priority group, or queue, to which the constraint was added. Depending on the particulars included in the additional information, and the model-constraints, the conflict is resolved by the interactive constraint solver application.

20 Claims, 8 Drawing Sheets

(56) References Cited

U.S. PATENT DOCUMENTS

| | | | | |
|---|---|---|---|---|
| 2012/0155264 A1* | 6/2012 | Sharma | ............... | H04L 43/0852 370/232 |
| 2014/0089480 A1 | 3/2014 | Zhu | | |
| 2015/0118756 A1* | 4/2015 | Pollack | ............... | G01N 35/0092 436/43 |
| 2015/0348065 A1 | 12/2015 | Doganata et al. | | |
| 2016/0086081 A1 | 3/2016 | Lee et al. | | |
| 2016/0306671 A1 | 10/2016 | Kadioglu et al. | | |

OTHER PUBLICATIONS

Lecoutre et al., "Reasoning from Last Conict(s) in Constraint Programming", dated 2009, 39 pages.

Kovacs et al., "Constraint Programming Approach to a Bilevel Scheduling Problem", dated Mar. 4, 2010, 29 pages.

Hladik et al., "Solving Allocation Problems of Hard Real-Time Systems with Dynamic Constraint Programming", dated 2006, 10 pages.

Asaf et al., "Applying Constraint Programming to Identification and Assignment of Service Professionals", Springer-Verlag Berlin Heidelberg, 2010, pp. 24-37.

Frisch et al., "The Rules of Constraint Modelling", Artificial Intelligence Group, Dept. of Computer Science, Univ. of York, UK, 2005, 8 pages.

IBM, "WebSpaere eXtreme Scale Overview", Available at : <http://www-01.ibm.com/support/knowledgecenter/SSTVLU_7.1.1/com.ibm.websphere.extremescale.doc/cxsoverview.html>, Retrieved on Aug. 27, 2015, 3 pages.

Kuhn, H. W., "The Hungarian Method for the Assignment Problem", Mar. 1955, pp. 83-97.

Milano et al., "Constraint Programming", Intelligenza Artificiale, vol. 3, No. 1-2, pp. 28-34, 2006.

Naveh et al., "Workforce Optimization: Identification and Assignment of Professional Workers Using Constraint Programming", Ibm J. Res. & Dev., vol. 51, No. 3/4, May/Jul. 2007, pp. 263-279.

Richter et al., "Optimatch: Applying Constraint Programming to Workforce Management of Highly Skilled Employees", Int. J. Services Operations and Informatics, vol. 3, N. 3/4; 2008, pp. 258-270.

Slaney, John, "Constraint Modelling: A Challenge for First Order Automated Reasoning", NICTA and the Australian National University Jul. 2009 pp. 11-21.

Smith, Barbara M., "A Tutorial on Constraint Programming", School Of Computer Studies Research Report Series, Apr. 1995, pp. 1-21.

Smith, Barbara M., "Modelling for Constraint Programming", Cork Constraint Computation Centre, University College Cork, Ireland, Sep. 2005, 18 pages.

* cited by examiner

| RESOLUTION | EFFECT ON SOLUTION |
|---|---|
| REJECT CHOICE-CONSTRAINT CAUSING CONFLICT 350 | NO CHANGE 352 |
| KEEP HIGHER PRIORITY CHOICE-CONSTRAINT AND REMOVE CONFLICTING LOWER PRIORITY CHOICE-CONSTRAINT 354 | ONLY HIGHER PRIORITY CHOICE-CONSTRAINT REMAINS 356 |
| KEEP LOWER PRIORITY CHOICE-CONSTRAINT AND REMOVE CONFLICTING HIGHER PRIORITY CHOICE-CONSTRAINT 358 | ONLY LOWER PRIORITY CHOICE-CONSTRAINT IN LOWER PRIORITY GROUP REMAINS 360 |
| SWAP LOWER PRIORITY CHOICE-CONSTRAINT AND CONFLICTING HIGHER PRIORITY CHOICE-CONSTRAINT 362 | BOTH CHOICE-CONSTRAINTS REMAIN BUT THEIR PRIORITIES HAVE CHANGED 364 |
| REMOVE BOTH CONFLICTING CHOICE-CONSTRAINTS 366 | BOTH CHOICES ARE REMOVED 368 |

INTERACTIVE CONSTRAINT SOLVER

PRIORITY CLAIM

This U.S. patent application claims priority to, and the benefit of, U.S. Provisional Patent Application No. 62/054,260 filed Sep. 23, 2014, the entirety of which is hereby incorporated by reference herein.

FIELD

This patent application is generally directed to constraint programming and more specifically, to an interactive constraint solver.

BACKGROUND

Constraint programming is a programming paradigm that is used to solve problems that depend on a number of different variables that have relationships with one another. The relationships between variables are expressed as constraints. Examples of problems that have been solved using constraint programming include scheduling (e.g., of people and other resources) and combinatorial optimization problems (e.g., configurations of automobiles or computers). Constraint programming is used to find feasible assignments to a set of variables subject to one or more constraints defining a problem. When the problem is successfully solved, values will be assigned to all the variables in the solution such that all constraints are satisfied. Conflicts occur when it is not possible or permissible to satisfy all the constraints. When constraints conflict the problem is not successfully solved. A valid solution requires that all constraints be satisfied.

Constraint solving systems can communicate with client applications to receive constraints between variables. In some systems, client applications do not have the ability to assign priorities or weights to constraints.

These systems, by definition, provide only two categories of constraints: user-selections made by the end-user, and non-override-able constraints that have been added by the client application.

Further, these systems do not have the capability to provide additional categories of constraints and have profound limits in how conflicts are resolved. For example, in current systems, any conflict within the non-override-able constraints will always reject a subsequently received user-selection or a subsequently received non-override-able constraint. Resolution of conflicts between two or more of the user-selections involves re-ordering past user-selection to determine if the new user-selection can be implemented in a solution. Conflicts between selections and non-override-able choices are always resolved in favor of the non-override-able choices.

As such, in existing systems, users of client applications do not have the ability to decide which user-selections are given greater weight when more than one user is submitting user-selections.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Interactive Constraint Solver Application
3.0 Example Interactive Constraint Solver Process
4.0 Example Implementation of the Constraint Solver Process
5.0 Hardware Overview
6.0 Extensions and Alternatives 1.0. General Overview The interactive constraint solver application finds feasible assignments of values to a set of variables subject to one or more model-constraints defining a problem. The interactive constraint solver application can change the current value of a variable defined in the problem and can handle conflicts between choice-constraints and model-constraints. The interactive constraint solver application can affect the value of a variable by introducing new constraints between variables (e.g., by adding a choice-constraint). The interactive constraint solver application maintains a queue of the choice-constraints. When the problem is successfully solved, all variables in the solution are bound such that all constraints are satisfied. Elsewhere in this document, the concept of variable assignment is used interchangeably with variable binding.

Described herein are approaches that allow client applications using the interactive constraint solver applications to have partial control of the order of choice-constraints while allowing the interactive constraint solver to control the absolute order of the processing of choice-constraints to the solution. The interactive constraint solver application resolves conflicts according to model-constraints that have been set by an application developer. The ability to provide model-constraints, allows the application developer to tailor the client application to the problem being solved.

Techniques described herein improve the operation of the client application by giving the application developer more control over the process of processing submitted choice-constraints and handling any conflicts that result. The priority group mechanism eases the application developer's task by allowing the developer to implement this complexity in their application.

2.0 Example Interactive Constraint Solver Application

Figure 1:
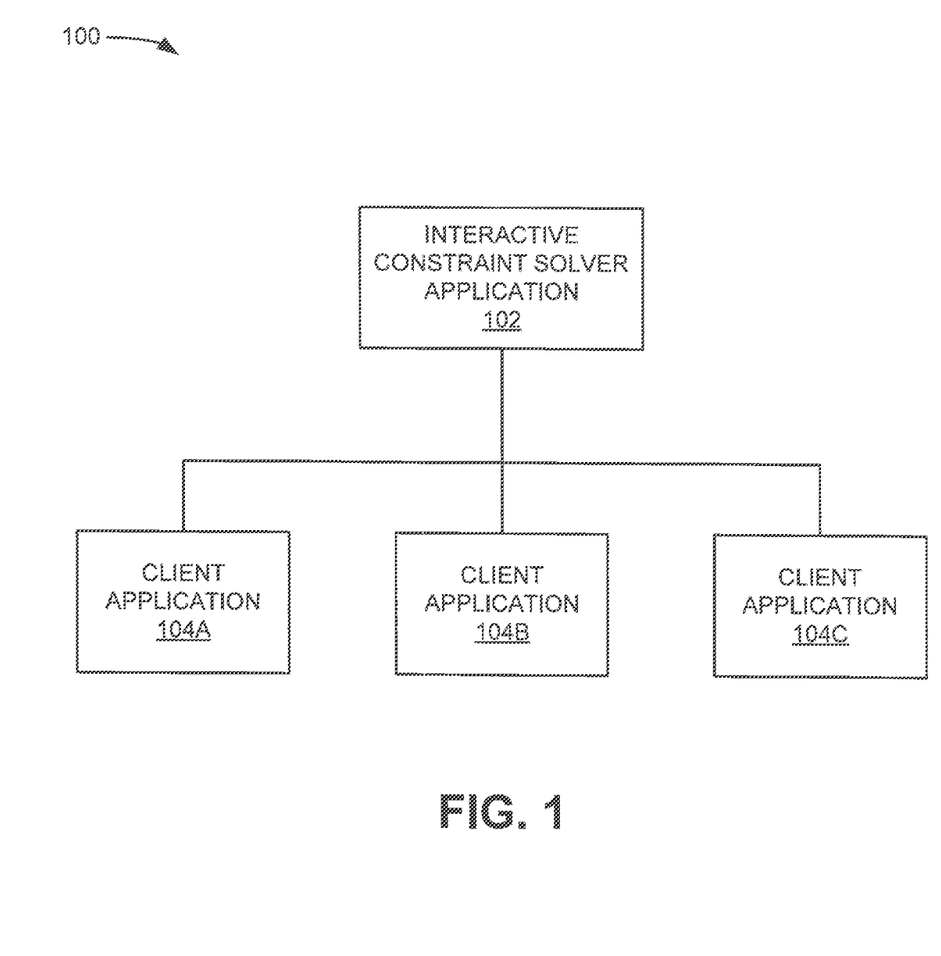
FIG. 1 is an illustration of an environment in which various embodiments can be implemented.

FIG. 1 is an illustration of an environment 100 in which various embodiments can be implemented. The environment 100 includes an interactive constraint solver application 102 in electronic communication with one or more client applications 104A-C.

The interactive constraint solver application 102 is configured to receive a set of variables and a set of model-constraints that define relationships between the variables in the set of variables from a client application, into which a developer of that client application has coded the model-constraints. The set of model-constraints can comprise non-override-able constraints and other types of constraints. For example, for each of the client applications, the set of model-constraints can include one or more business rules defined for the client application. In some embodiments, the application developer, defines and builds the client applications 104A, B, and C for users to interact with the interactive constraint solver application 102. Users interact with various instances of client applications 104A-C to submit user choice-constraints. Model-constraints are defined by the application developer and choice-constraints are submitted by a user of one of the client application 104 A, B, or C.

The client application 104 is also configured to receive business rules from the application developer to establish a set of queues to which respective user choice-constraints can be added according to the business rules. Logical relationships between the established queues can be dictated by one or more business rules, as described below. In some embodiments, each queue can correspond to a role of a stakeholder submitting a choice-constraint. A stakeholder, as used herein, refers to a person, or a person acting on behalf of an entity, who submits a choice-constraint. A stakeholder or user has a role. The role of the stakeholder or user is used by the business rules to place choice-constraints into a priority group.

After receiving user choice-constraints, the interactive constraint solver application 102 assigns each user choice-constraint to a priority group according to business rules dictating how the user choice-constraints are allocated to the priority groups. The business rules are received from a client application 104, into which a developer of that client application 104 has defined the business rules. In some embodiments, the client application 104 can provide a "modeling toolkit" that can be used to define business rules or to select business rules that are defined in the toolkit and stored in a database. These rules are retrieved when the client application 104 starts a session. In other embodiments, client application 104 can be used by an application developer to code the business rules directly into their application. For each priority group, the user choice-constraints are arranged into a queue corresponding to a priority group according to one or more business rules.

The interactive constraint solver application 102 provides capabilities that allow users to interact with the interactive constraint solver application 102. One capability is to add user selections (assignment of values to one or more variables in the form of choice-constraints), through user interface interaction, to the solution. These user choice-constraints can result in the interactive constraint solver application 102 providing a user-preferred solution.

In an embodiment, the assignment of choice-constraints to priority groups in an interactive constraint solver application 102 is achieved as a consequence of the following factors. The client application can create any number of priority groups, each having a unique priority. The priority groups, and therefore the choice-constraints contained within different priority groups, are processed from highest priority to lowest priority. Client applications can add choice-constraints to priority groups and remove choice-constraints from priority groups. Client applications can also move choice-constraints between priority groups. These operations are subject to validation. That is, moving a choice-constraint from one group to another can cause conflicts. For each priority group, client applications are prevented from creating priority among choice-constraints within that priority group. Within each priority group, the interactive constraint solver application maintains the order of choice-constraints to support other interactive constraint solver application 102 functions such as conflict resolution. A conflict occurs when one or more choice-constraints cannot co-exist in the solution without violating one or more model-constraints or choice-constraints.

The client applications 104 are each dedicated to solving one or more separate problems that are solved by assigning values to a set of variables. The client applications 104 can provide model-constraints or pre-defined business rules. The received constraints can be stored and maintained by the interactive constraint solver application 102. In addition, each client application can define one or more priority groups into which choice-constraints are assigned. Each client application 104 may present a user interface via which a stakeholder can submit choice-constraints. The client application 104 can add the stakeholder-submitted choice-constraints to a respective priority group based on a role of the stakeholder. Examples of roles include "company", "manager", and "employee". The role of the stakeholder is used when processing choice-constraints submitted by the stakeholder.

Upon receiving choice-constraints from one of the client applications 104, the interactive constraint solver application 102 can determine a solution to the problem that satisfies the model-constraints and the choice-constraints.

Figure 2:
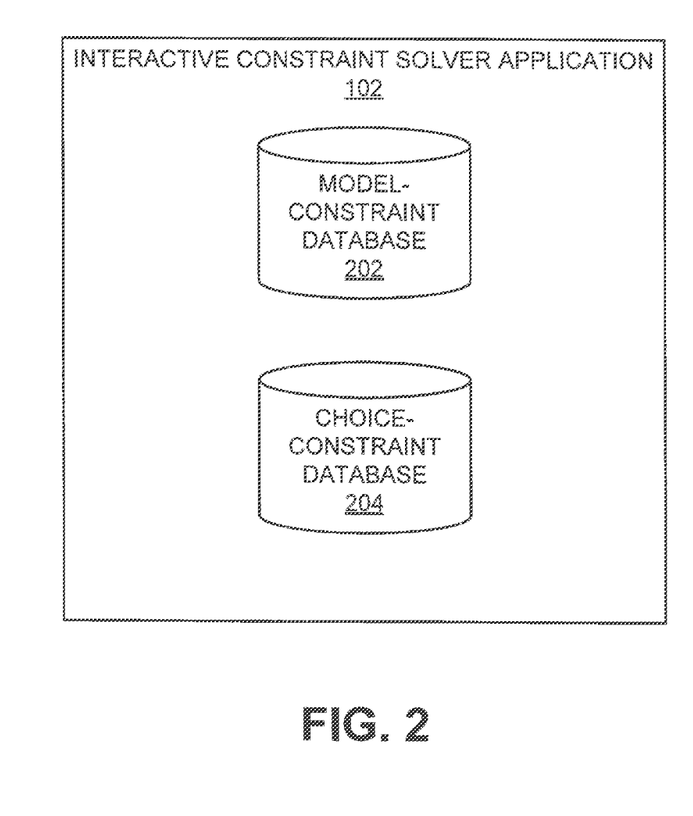
FIG. 2 is a block diagram of an example interactive constraint solver application, according to various embodiments.

FIG. 2 is a block diagram of an example interactive constraint solver application 102, according to various embodiments. The interactive constraint solver application 102 comprises a choice-constraint database 204 and a model-constraint database 202. The databases 202 and 204 can be combined into a single database or be further divided into additional databases.

The interactive constraint solver application 102 is configured to obtain and store, for later retrieval, constraints used to solve a problem for the client application 104. The constraints include both model-constraints (stored in the model-constraint database 202) and choice-constraints (stored in the choice-constraint database 204). Using various instances of client applications 104A-C, users of those client applications can submit choice-constraints. A choice-constraint is a constraint generated by one of the client applications 104A, 104B, or 104C from a selection submitted by the user via one of the client applications 104A, 104B, or 104C. The interactive constraint solver application 102 optionally receives an indication of a priority group in which the choice-constraint belongs.

The interactive constraint solver application 102 is configured to control an ordering of choice-constraints received from the client application 104. According to some embodiments, the client application 104 controls the ordering of the choice-constraints when certain choice-constraints are more important than others. The order of the choice-constraints is treated with priority by virtue of being assigned to a priority group. For example, a client application 104 can assign choice-constraints to three priority groups. In embodiments where choice-constraints are defined by virtue of a role of a stakeholder, the priority groups can be: company-required, employee-must-have, and employee-like-to have, where choice-constraints assigned to the company-required priority group are given the highest priority. The interactive constraint solver application 102 controls the order of choice-constraints within the priority groups to fulfill predefined constraints such as product requirements or business rules. When adding a new choice-constraint, the interactive constraint solver application 102 determines where to add the choice-constraint to the set of the choice-constraints within each priority group.

The interactive constraint solver application 102 is configured to resolve conflicts between choice-constraints according to the relative priority of the priority group to which the conflicting choice-constraints are assigned. As part of conflict resolution, the interactive constraint solver manipulates the set of choice-constraints within each priority group.

An example of a conflict follows. The user first submits the choice-constraint "carBodyColor=Red" and later attempts to submit the choice-constraint "carBodyColor=Blue". The second choice-constraint conflicts with the first because the carBodyColor is limited to one color. To resolve the conflict, the interactive constraint solver application 102 changes the order of the choice-constraints. The interactive constraint solver application 102 moves the conflicting choice-constraint whose addition is being attempted, "carBodyColor=Blue", to the highest priority within its priority group according to a business rule indicating that more recent choice-constraints supersede earlier choice-constraints. In some instances, one or more other choice-constraints may be automatically removed from the solution. In this example, the choice-constraint "carBodyColor=Red" is removed while the choice-constraint "carBodyColor=Blue is preserved.

3.0 Example Interactive Constraint Solver Process

Figure 3A:
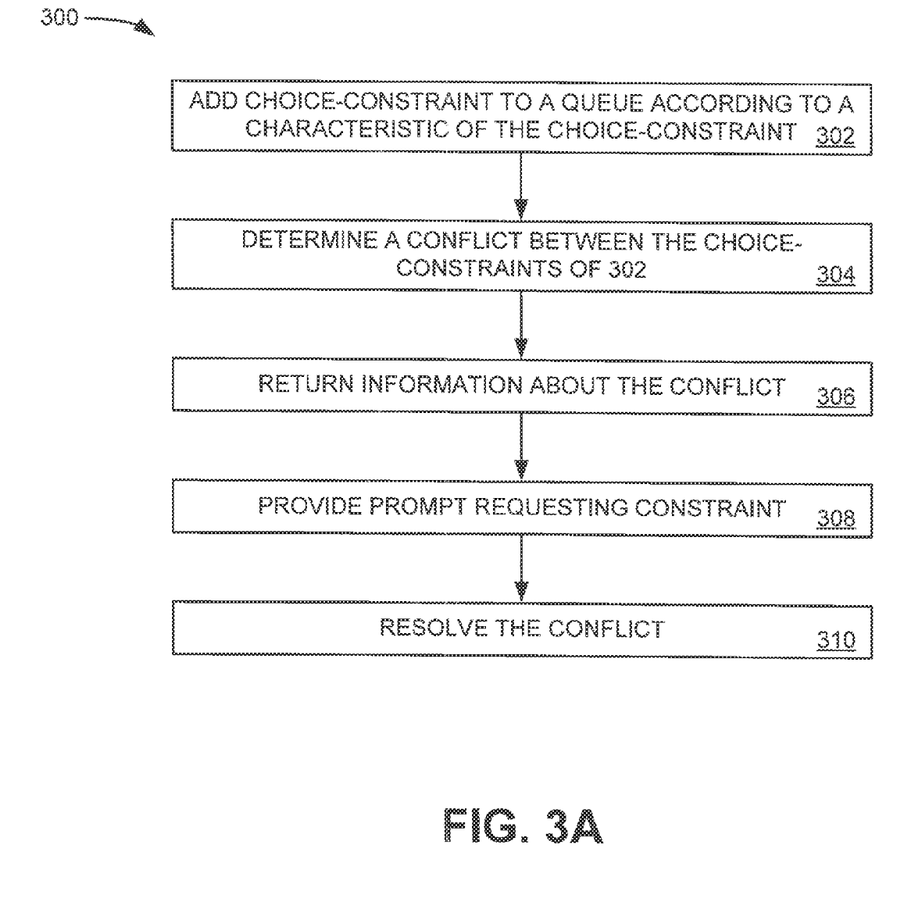
FIG. 3A is a flowchart of an example method of ordering constraints within priority groups, according to various embodiments.

FIG. 3 is a flowchart of an example method 300 of resolving a conflict between two or more choice-constraints, according to various embodiments. The method 300 can be performed by the interactive constraint solver application 102 and/or the client application 104, as described herein.

Choice-constraints are initially added to one or more corresponding queues. The queues are each associated with a relative priority to the other queues. The rules dictate the placement of each choice-constraint among other choice-constraints within a particular queue including, for example, based on a chronology of when the choice-constraints were received.

The client application 104 has some control over the ordering of choice-constraints by virtue of the priority groups corresponding to the queues. The client application 104 defines the priority groups, including the number of priority groups and their relative priorities. The client application 104 further identifies which choice-constraints are added to or retracted from which priority groups, when choice-constraints can be moved between priority groups, and how to handle conflicts between choice-constraints. For example, the client application 104 can define priority groups such as: company-required, employee-must-have, and employee-like-to-have choice-constraints, where company-required choice-constraints having a highest relative priority.

In an operation 302, a new choice-constraint is added to one of the queues according to a characteristic of the choice-constraint. The characteristics of the choice-constraint may be defined by the client application 104 or based on a pre-existing business rules such as a time that the choice-constraint was received, a role of a stakeholder from whom the choice-constraint was received, and/or one or more constraints.

In an operation 304, a conflict, between the new choice-constraint of operation 302 and one or more choice-constraints contained in the queue into which the new choice-constraint was added, is detected. In an operation 306, in response to the detection of the conflict between the new choice-constraint and another choice-constraint, information is provided to the client application 104. This information allows the client application 104 to distinguish between various situations and allows the client application 104 to decide how to resolve the conflict based on the business rules defined by the client application.

The interactive constraint solver application 102 distinguishes between various types of conflicts. A first type of conflict is a conflict that occurs between two choice-constraints within the same priority group. A second type of conflict is a conflict that occurs between a later choice-constraint that was chronologically added to a higher priority group following the addition, to a lower priority group, of an earlier choice-constraint that conflicts with the later choice-constraint. For an example of this second type of conflict, a company-required choice-constraint (highest priority group) might be chronologically added after an employee-like-to-have choice-constraint (low priority group) has been added. A third type of conflict is a conflict that occurs when a choice-constraint in a lower priority group is chronologically added after a choice-constraint in a higher priority group; e.g., an employee-like-to-have choice-constraint chronologically is added after an employee-must-have choice-constraint.

In an operation 308, the interactive constraint solver application 102 provides a prompt to the user requesting a further constraint that, when applied, resolves said conflict. The prompt can include information about the constraints that are in conflict. In some instances, the prompt can include a menu of constraints from which the user can choose to resolve the conflict.

Figure 3B:
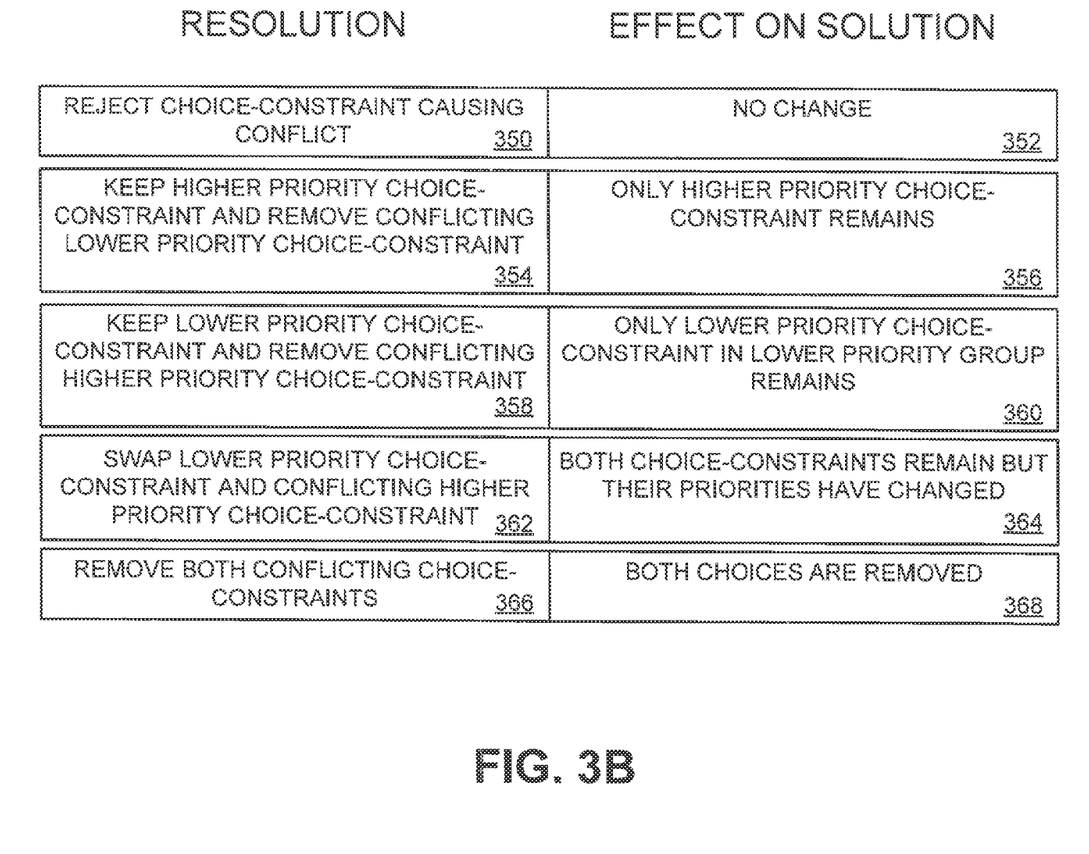
FIG. 3B is a chart depicting example ways a conflict can be resolved, according to various embodiments.

In an operation 310, the conflict is resolved by the interactive constraint solver application 102 based on the model-constraint and which priority group and/or choice-constraints are in conflict. Situations where the attempt to resolve the conflict are discussed below. In situations where the attempt to resolve the conflict in successful, the conflict can be resolved in one of five ways as depicted in FIG. 3B. First, the conflict can be resolved by rejecting the choice-constraint that caused the conflict (box 350). This results in no change to a current solution (box 352). Second, the conflict can be resolved by keeping the company-required (higher priority group) choice-constraint and removing the conflicting employee-like-to-have (lower priority group) choice-constraint (box 354). Only the company-required choice-constraint remains in the current solution (box 356). Third, the conflict can be resolved by keeping the employee-like-to-have (lower priority group) choice-constraint and removing the conflicting company-required (higher priority group) choice-constraint (box 358). Only the like-to-have choice-constraint remains both in the current solution and in the employee-like-to-have priority group (box 360). Fourth, the conflict can be resolved by swapping the like-to-have choice-constraint in the lower priority group with its conflicting must-have choice-constraint in the higher priority group (box 362). Both choice-constraints remain in the solution but their priorities have changed (subject to additional validation and conflict resolution if the re-ordering also conflicts) (box 364). Fifth, the conflict can be resolved by removing the choice-constraints that are in conflict (box 366). The original choice-constraint is not added to its priority group, and the other choice-constraint is removed from the solution resulting in both choice-constraints being removed (box 368).

The interactive constraint solver application 102 determines or updates feasible assignments to a set of variables subject to the one or more model-constraints and business rules defining a problem. When the problem is successfully solved, values are assigned to all the variables in the solution such that the constraints are satisfied.

In an interactive constraint solver application 102, the users add choice-constraints to direct the solver application to a user-preferred solution. When the users have finished adding choice-constraints, the client application directs the solver application complete the solution.

In some embodiments, the interactive constraint solver application 102 maintains a queue of the choice-constraints. Each choice-constraint is added to the end of the queue. The interactive constraint solver application 102 processes the choice-constraints (processing the choice-constraints is known as propagation) to find any conflicts with earlier choice-constraints and/or model-constraints defined in the problem.

The client application 104 can add any number of queues as priority groups. Each priority group is added to a session of the client application 104. A session is a semi-permanent interactive information interchange between the client application and a user. A session is set up or established at a certain point in time, and then torn down at some later point. Within a priority group, the user does not further specify the order of choice-constraints as the ordering is controlled by the interactive solver application 102. Each priority group is assigned a priority relative to the other priority groups. There is precedence among the priority groups: choice-constraints in higher priority groups are applied to the solution before choice-constraints in lower priority groups are applied to the solution. The client application 104 can add, retract, and query for choice-constraints in the priority groups. As the client application 104 adds choice-constraints to the various priority groups, the interactive constraint solver application 102 can add each choice-constraint to the end of the queue of respective priority group containing the choice-constraint and can apply the choice-constraint(s) to the solution. If there is no conflict, the user choice-constraints remain in the solution.

However, when the interactive constraint solver application 102 discovers a conflict between choice-constraints and/or model-constraints, the interactive constraint solver application 102 stops processing and signals the conflict. The interactive constraint solver application 102 recognizes conflicts between choice-constraints within the same priority group and choice-constraints in different priority groups. The interactive constraint solver application 102 provides capabilities to handle conflicts between the choice-constraints. These capabilities allow the application developer to resolve the conflict in a way that meets his business requirements as well as user interface needs. The interactive constraint solver application 102 only determines that a conflict is resolved.

The interactive constraint solver application 102 resolves conflicts occurring between two choice-constraints within the same priority group. The interactive constraint solver application 102 can resolve a conflict in a variety of ways. For example, the interactive constraint solver application 102 can reject the choice-constraint and revert to the previous state of the solution. For another example, the interactive constraint solver application 102 can override the conflict.

To override the conflict, the interactive constraint solver application 102 can update the priority group's queue order by moving the latest choice-constraint from the end of the priority group's queue to the front. The interactive constraint solver application 102 again processes all the choice-constraints. If no further conflict is found, the recently moved choice-constraint remains at the front of the queue. Additionally, under such circumstances, the set of choice-constraints that conflicted with the recently moved choice-constraint are dropped from the solution and the priority group. The override sets the recently moved choice-constraint to the highest priority in the priority group until either the recently moved choice-constraint is removed or a future conflict occurs.

The interactive constraint solver application 102 also resolves conflicts occurring between choice-constraints in different priority groups. In one embodiment, a client application 104 has defined two priority groups. These priority groups are "must-have" and "like-to-have." The "must-have" priority group has a higher priority than the "like-to-have" priority group.

The conflict can be between a new choice-constraint in the higher priority group and an existing choice-constraint in the lower priority group. For example, the "must-have" choice-constraint can be created after the "like-to-have" choice-constraint. The interactive constraint solver application 102 can resolve the conflict in one of two ways. The interactive constraint solver application 102 can reject the "must-have" choice-constraint and revert to the previous state of the solution. Or the interactive constraint solver application 102 can retain the "must-have" choice-constraint (at the end of the queue for the "must-have" priority group) and remove the "like-to-have" choice-constraint from its priority group.

The conflict can be between a new user choice-constraint in the lower priority group and an existing choice-constraint in the higher priority group. For example, the "like-to-have" choice-constraint might be created chronologically after the "must-have" choice-constraint. The interactive constraint solver application 102 resolves the conflict in one of three ways. First, the interactive constraint solver application 102 can reject the "like-to-have" choice-constraint and revert to the previous state of the solution. Second, the interactive constraint solver application 102 can retain the "like-to-have" choice-constraint (at the end of the queue for the "like-to-have" priority group) and remove the "must-have" choice-constraint from the "must-have" priority group. Third, the interactive constraint solver application 102 can swap the "like-to-have" choice-constraint with the "must-have" user choice-constraint. Both choice-constraints remain in the solution but are in different priority groups.

In some cases, the resolution itself can fail. Even after re-ordering choice-constraints in the priority groups, the interactive constraint solver application 102 can still find other conflicts during propagation. When this situation occurs, neither the resolution nor the original choice-constraint can be completed. The interactive constraint solver application 102 reverts to the state before the original choice-constraint was attempted and sends a message to the client application 104 to that effect.

4.0 Example Implementation of the Constraint Solver Process

FIGS. 4, 5, 6, and 7 depict examples of ordering choice-constraints, according to various embodiments. In these examples, the priority groups are used in an employee scheduling application that uses the interactive constraint solver application 102 to create monthly shift schedules. The client application 104 allows for company, managerial, and employee choice-constraints to be made before the final schedule is calculated.

Figure 4:
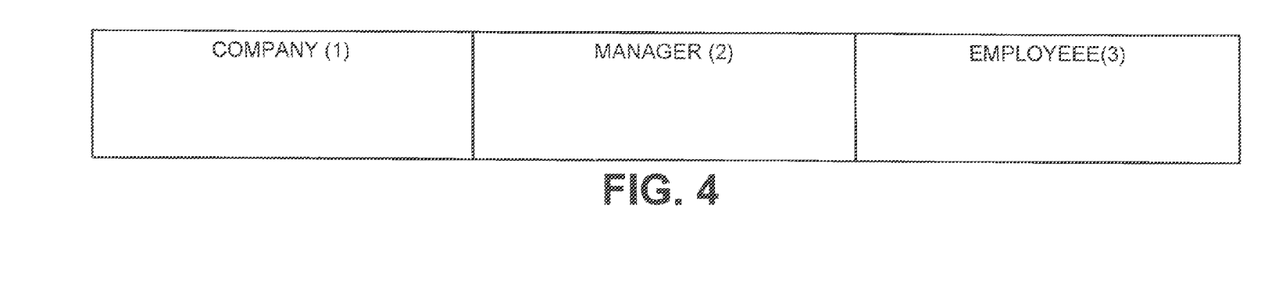
FIG. 4 depicts a general format of queues or groups that are used to order choice-constraints.

In this example, for every day in the schedule, and for every employee in the schedule, a selection is made from this set: {OFF, WORK, VACATION, TRAINING}. An example choice-constraint can be: Arthur.May07=TRAINING.

The client application 104 collates these choice-constraints into three priority groups: COMPANY, MANAGER, and EMPLOYEE. The priority of processing the priority groups is the same order. Therefore, COMPANY choice-constraints have the highest priority and are processed before the MANAGER and EMPLOYEE choice-constraints. The COMPANY choice-constraints are also processed before the final calculation of the full schedule by the interactive constraint solver application 102. FIG. 4 depicts a representation of these three priority groups that will be populated by the choice-constraints.

The client application 104 has these business rules: Rule R1: TRAINING and VACATION days are added to COMPANY group. TRAINING cannot be removed during an interactive session. Rule R2 is that a manager can add or remove choice-constraints for employees for OFF and WORK days. These choice-constraints are added to the MANAGER group. Rule R3 is that an employee can add or remove choice-constraints for themselves for OFF and WORK days. These choice-constraints are added to the EMPLOYEE group. Rule R4 is that an employee can add or remove choice-constraints for VACATION. These choice-constraints are added to the COMPANY group.

Client application 104 also defines business rules that deal with circumstances in which a new choice-constraint is being added and conflicts with existing choice-constraints. Examples of these rules follow. Rule R5 is that a manager or employee cannot override a TRAINING day. Rule R6 is that an employee can override his own VACATION day but a manager cannot. Rule R7 is that an employee cannot override any manager selection. Rule R8 is that a manager can override any employee selection (but will be prompted).

In the following examples, each choice-constraint is represented by a circle. Each choice-constraint is named in chronological order and shown in the correct priority position in its respective priority group. The propagation order of the choice-constraint is shown below the choice-constraint.

Figure 5:
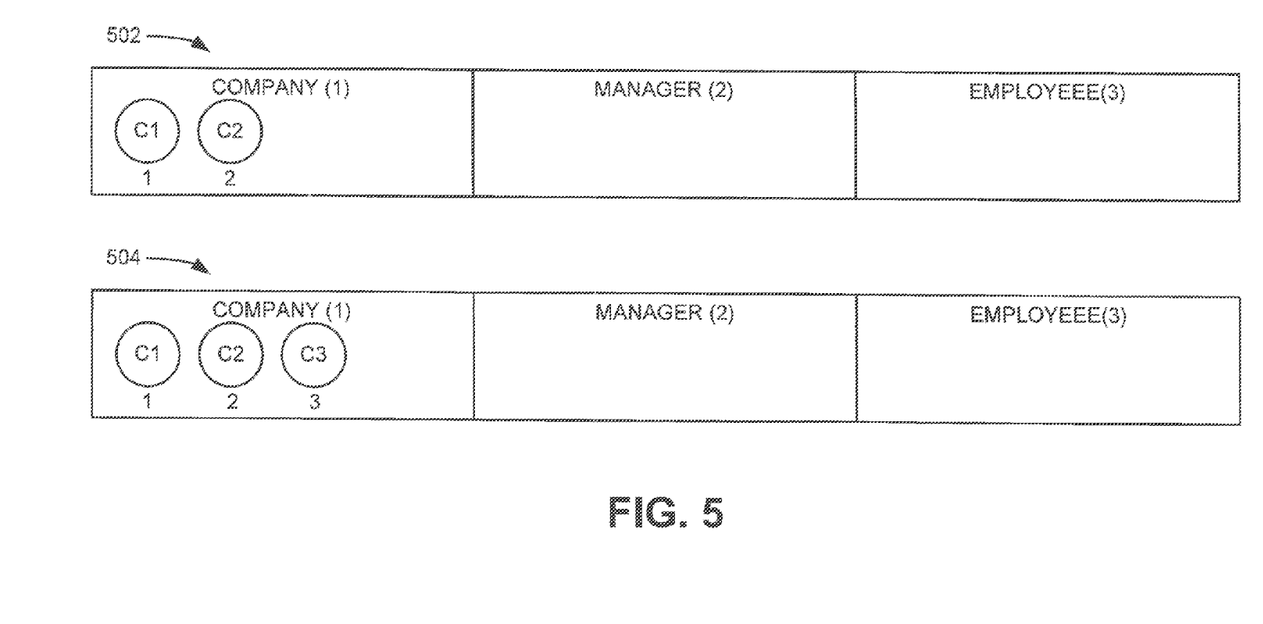
FIG. 5 depicts examples of constraints being ordered within priority groups according to business rules during a first session, according to various embodiments.

In FIG. 5, choice-constraints submitted during a first session are depicted. First, as shown in state 502, the application adds mandatory training: C1 {Leonard.May07=TRAINING} and C2 {Arthur.May07=TRAINING}. According to rule R1, these choice-constraints are added to the COMPANY group. Second, as shown in state 504, the user chooses a vacation day: C3 {Arthur.May08=VACATION}. According to rule R4, this choice-constraint is added to the COMPANY group.

Figure 6:
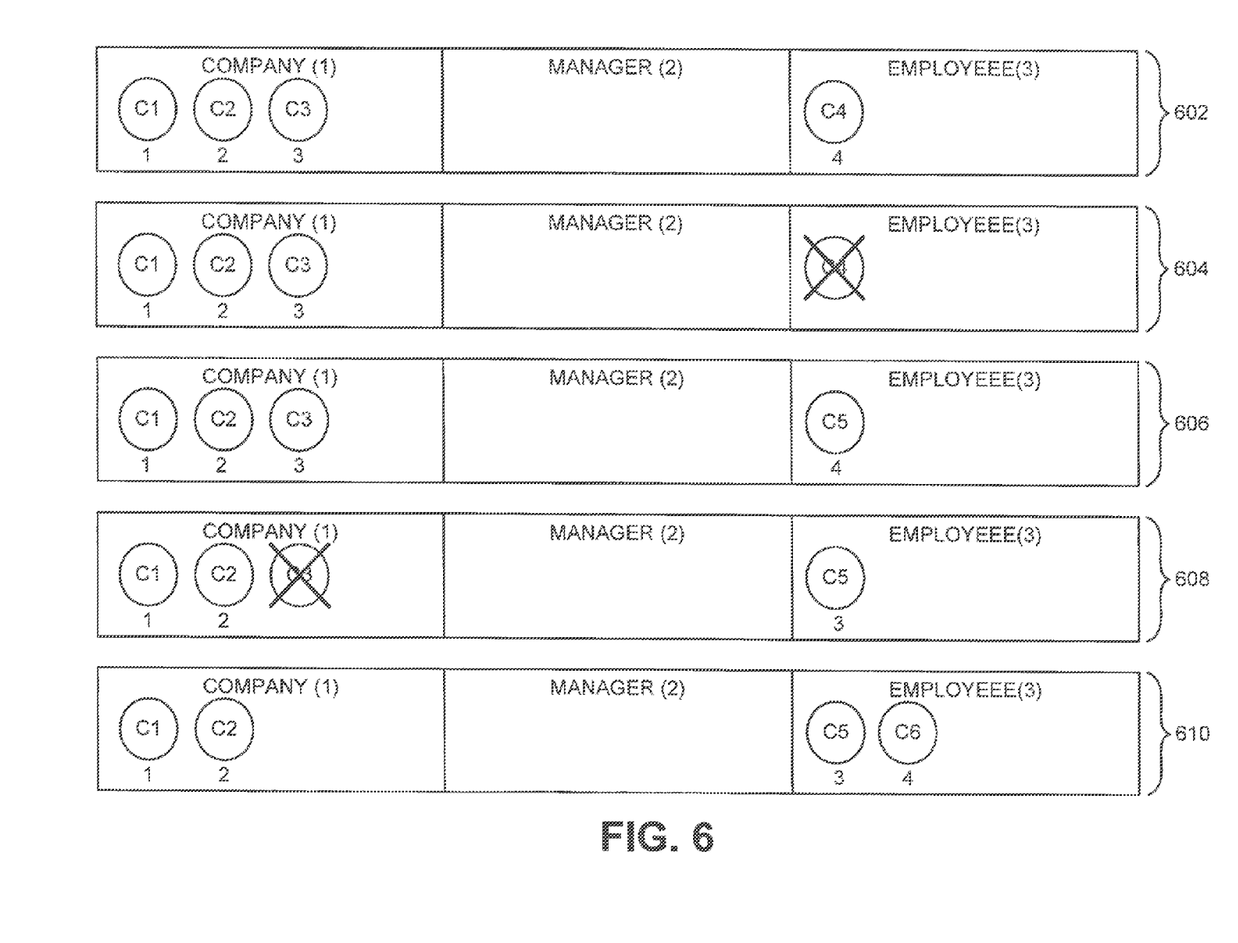
FIG. 6 depicts examples of constraints being ordered within priority groups according to business rules during a second session, according to various embodiments.

In FIG. 6, a second session begins by reloading choice-constraints C1, C2, and C3 as shown in state 602. The user, Arthur, having the role of "employee", submits choice-constraint C4 {Arthur.May07=OFF}. The choice-constraint C4 is made by the employee. The choice-constraint is added to the EMPLOYEE group, according to rule R3 as shown in state 602.

The choice-constraint C4, {Arthur.May07=OFF}, conflicts with choice-constraint C2, {Arthur.May07=TRAINING}. Because C2 is in the COMPANY group and not a "vacation" constraint, the rule R1 requires the rejection of C4. C4 is removed as shown in state 604. The client application 104 decides what, if any, information to provide to Arthur. Examples of information that can be provided include the constraint C2, the role (e.g., COMPANY) of the user who submitted the constraint C2, and the role (e.g., EMPLOYEE) of Arthur when he submitted constraint C4. In some embodiments, the information informs Arthur as to why his choice is invalid, including information about company policy and that his choice conflicts with that policy. This information can imply or explicitly include information about Arthur's role. The client application 104, based on instructions received from an application developer, can determine how to communicate the conflict. In some instances, the employee may not have been aware of the company policy, or that their request would conflict.

The employee, Arthur, chooses a work day: C5 {Arthur.May08=WORK}, which is added to the EMPLOYEE group according to rule R3 as shown in state 606.

Because choice-constraint C3 is VACATION and the employee submitted the C5 choice-constraint, the business rule R6 requires the employee to decide which choice-constraint to keep. The client application's user interface notifies Arthur of the conflict and the options. Arthur decides to work instead of taking vacation, and user choice-constraint C3 is retracted as shown in state 608.

During the second interactive session, Arthur selects a non-work day: C6 {Arthur.May10=OFF}. The user choice-constraint is added to the EMPLOYEE group according to rule R3 as shown in state 610. There is no other choice-constraint concerning May $10^{th}$, and this selection does not violate any business rules.

Figure 7:
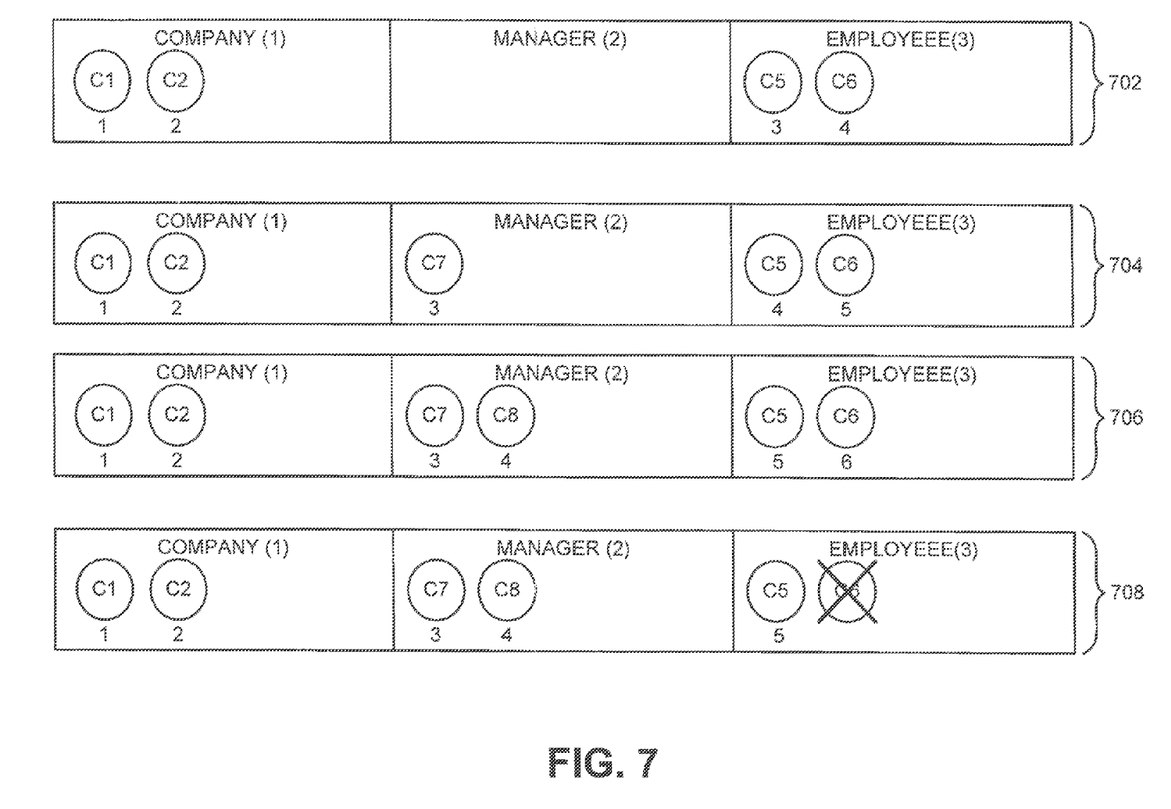
FIG. 7 depicts examples of constraints being ordered within priority groups according to business rules during a third session, according to various embodiments.

FIG. 7 depicts choice-constraints added during a third interactive session, where a stakeholder having the role of "manager" inputs one or more choice-constraints. The choice-constraints submitted at the end of the second session are depicted as shown in state 702.

The manager submits a choice-constraint that Arthur is scheduled to work on the 9th. Choice-constraint C7 is created for {Arthur.May09=WORK} and added to the MANAGER group according to rule R2 as shown in state 704. There are no other choice-constraints by Arthur or the Company about May 9th, and thus no conflict.

The manager submits a choice-constraint indicating that Arthur is scheduled to work on the 10th. Choice-constraint C8 is created for {Arthur.May10=WORK} and added to the MANAGER group according to rule R2 as shown in state 708.

Arthur's choice-constraint C6 {Arthur.May10=OFF} conflicts with the manager's choice-constraint C8 {Arthur.May10=WORK}. Rule R8 requires that the manager decide which choice-constraint to keep. The interactive constraint solver 102 provides information about the conflict. The application displays the information in the user interface of the client application 104. The manager decides to have Arthur work. Choice-constraint C6 is removed as shown in state 708.

The manager has finished making choice-constraints and closes or exits the client application 104. The interactive constraint solver application 102 can now solve the problem and create the schedule.

5.0 Hardware Overview

Figure 8:
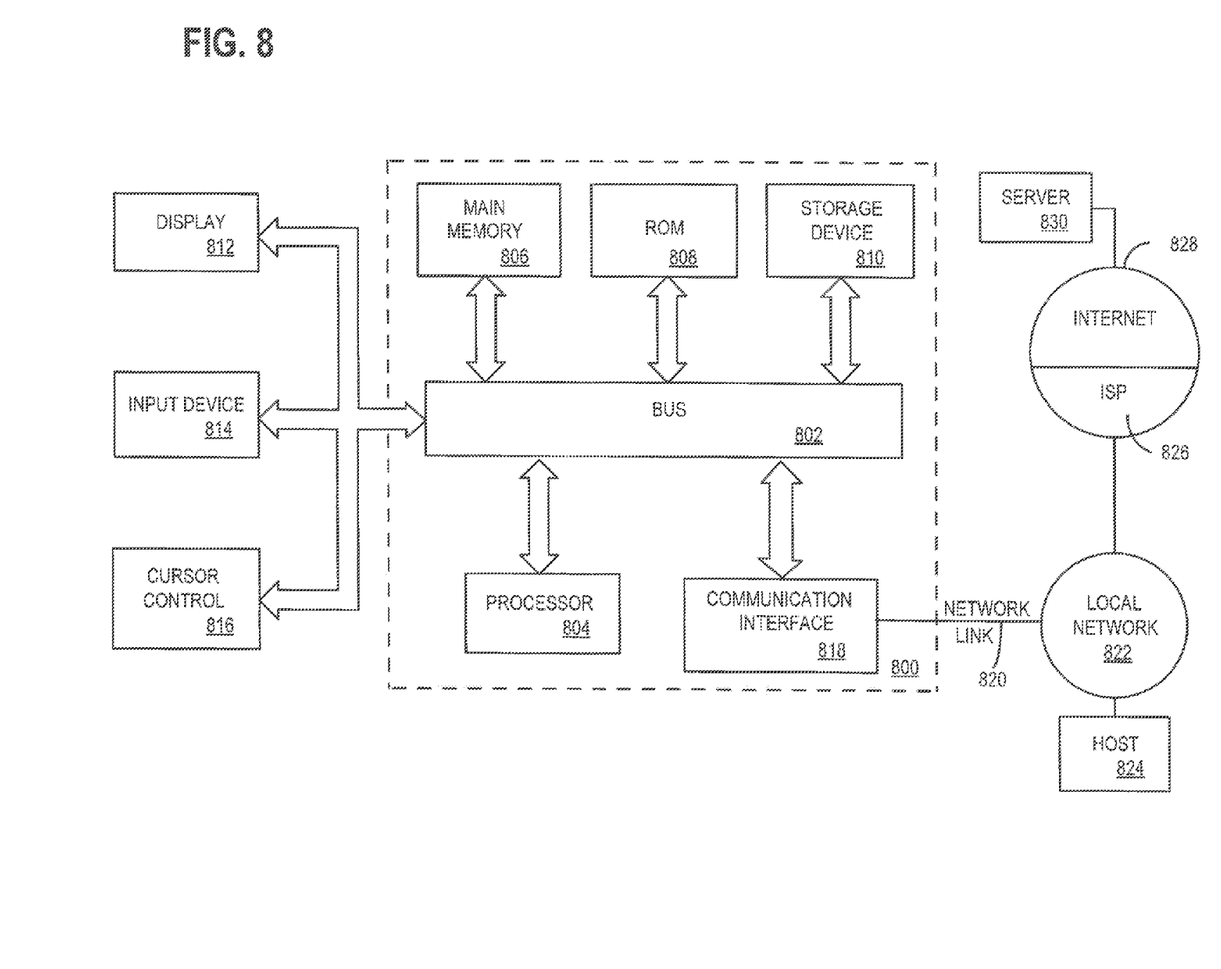
FIG. 8 is a block diagram of a computer system upon which various embodiments may be implemented.

FIG. 8 is a block diagram of a computer system upon which various embodiments may be implemented. According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 180 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 170, or other non-volatile storage for later execution.

The techniques described herein are implemented using one or more processing solutions, examples of which include distributed systems, clustered computing systems, and cloud computing systems. In an embodiment, the interactive constraint solver application is part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, etc. In this embodiment, any part (or the whole of) the functionality attributed to the entities within this description, is controllable via an interface that is exposed at a cloud computing system.

6.0 Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   identifying at least two priority groups of members having an interest in one or more variables within a solution to a problem, the at least two priority groups each having a defined relative priority in relation to at least one other group of the at least two priority groups;
   obtaining a first set of model-constraints, where the first set of model-constraints restrict choices that can be submitted by respective members of each of the at least two priority groups;
   receiving the choices from the respective members of each of the at least two priority groups, the choices including chosen values that can be assigned to a respective variable of the one or more variables;
   populating the chosen values into a first set or a second set according to a membership in a priority group of the member from whom the choice was received, the first set corresponding to a first priority group and the second set corresponding to a second priority group;
   determining the solution by assigning chosen values from the first set and then by assigning chosen values from the second set, wherein a particular constraint restricts a choice that can be submitted by a higher priority member with respect to a relatively lower priority member; and
   wherein the method is performed by one or more computers.

2. The method of claim 1, further comprising:
   determining that one of the chosen values received from the second priority group is in conflict with one of the chosen values received from the first priority group; and
   resolving the conflict according to a second set of constraints used to resolve conflicts.

3. The method of claim 2, wherein resolving the conflict comprises:
   determining that the one of the chosen values received from the first priority group was received after the one of the chosen values received from the second priority group.

4. The method of claim 3, further comprising:
   rejecting the one of the chosen values received from the first priority group according to the second set of constraints.

5. The method of claim 3, further comprising:
   retaining the one of the chosen values received from the first priority group and removing the one of the chosen values received from the second priority group according to the second set of constraints.

6. The method of claim 2, wherein resolving the conflict comprises:
   determining that the one of the chosen values received from the second priority group was received after the one of the chosen values received from the first priority group.

7. The method of claim 6, further comprising:
   rejecting the one of the chosen values received from the second priority group according to the second set of constraints.

8. The method of claim 6, further comprising:
   retaining the one of the chosen values received from the second priority group and removing the one of the chosen values received from the first priority group according to the second set of constraints.

9. The method of claim 6, further comprising:
   moving the one of the chosen values received from the second priority group to the first priority group according to the second set of constraints; and
   moving the one of the chosen values received from the first priority group to the second priority group according to the second set of constraints.

10. The method of claim 2, wherein the second set of constraints instruct providing a prompt to the respective member who submitted at least one of the chosen values, the prompt including the one of the chosen values received from the second priority group that is in conflict with the one of the chosen values received from the first priority group.

11. One or more non-transient computer readable media storing instructions that, when executed by one or more processors, cause:
   identifying at least two priority groups of members having an interest in one or more variables within a solution to a problem, the at least two priority groups each having a defined relative priority in relation to at least one other group of the at least two priority groups;

obtaining a first set of model-constraints, where the first set of model-constraints restrict choices that can be submitted by respective members of each of the at least two priority groups;

receiving the choices from the respective members of each of the at least two priority groups, the choices including chosen values that can be assigned to a respective variable of the one or more variables;

populating the chosen values into a first set or a second set according to a membership in a priority group of the member from whom the choice was received, the first set corresponding to a first priority group and the second set corresponding to a second priority group;

determining the solution by assigning chosen values from the first set and then by assigning chosen values from the second set, wherein a particular constraint restricts a choice that can be submitted by a higher priority member with respect to a relatively lower priority member.

12. The one or more non-transient computer readable media of claim 11 wherein the instructions, when executed by the one or more processors, further cause:

determining that one of the chosen values received from the second priority group is in conflict with one of the chosen values received from the first priority group; and resolving the conflict according to a second set of constraints used to resolve conflicts.

13. The one or more non-transient computer readable media of claim 12, wherein resolving the conflict comprises:

determining that the one of the chosen values received from the first priority group was received after the one of the chosen values received from the second priority group.

14. The one or more non-transient computer readable media of claim 13 wherein the instructions, when executed by the one or more processors, further cause:

rejecting the one of the chosen values received from the first priority group according to the second set of constraints.

15. The one or more non-transient computer readable media of claim 13 wherein the instructions, when executed by the one or more processors, further cause:

retaining the one of the chosen values received from the first priority group and removing the one of the chosen values received from the second priority group according to the second set of constraints.

16. The one or more non-transient computer readable media of claim 12, wherein resolving the conflict comprises:

determining that the one of the chosen values received from the second priority group was received after the one of the chosen values received from the first priority group.

17. The one or more non-transient computer readable media of claim 16 wherein the instructions, when executed by the one or more processors, further cause:

rejecting the one of the chosen values received from the second priority group according to the second set of constraints.

18. The one or more non-transient computer readable media of claim 16 wherein the instructions, when executed by the one or more processors, further cause:

retaining the one of the chosen values received from the second priority group and removing the one of the chosen values received from the first priority group according to the second set of constraints.

19. The one or more non-transient computer readable media of claim 16 wherein the instructions, when executed by the one or more processors, further cause:

moving the one of the chosen values received from the second priority group to the first priority group according to the second set of constraints; and moving the one of the chosen values received from the first priority group to the second priority group according to the second set of constraints.

20. The one or more non-transient computer readable media of claim 12, wherein the second set of constraints instruct providing a prompt to the respective member who submitted at least one of the chosen values, the prompt including the one of the chosen values received from the second priority group that is in conflict with the one of the chosen values received from the first priority group.

* * * * *

UNITED STATES PATENT AND TRADEMARK OFFICE
CERTIFICATE OF CORRECTION

PATENT NO. : 9,842,294 B2
APPLICATION NO. : 14/692602
DATED : December 12, 2017
INVENTOR(S) : Lee et al.

It is certified that error appears in the above-identified patent and that said Letters Patent is hereby corrected as shown below:

On the Title Page

On page 2, Column 1, under Other Publications, Line 1, delete "Conict(s)" and insert -- Conflict(s) --, therefor.

On page 2, Column 2, under Other Publications, Line 1, delete ""WebSpaere" and insert -- "WebSphere --, therefor.

In the Drawings

On sheet 5 of 8, in FIG. 4, Line 1, delete "EMPLOYEEE(3)" and insert -- EMPLOYEE(3) --, therefor.

On sheet 5 of 8, in FIG. 5, under Reference Numeral 502, Line 1, delete "EMPLOYEEE(3)" and insert -- EMPLOYEE(3) --, therefor.

On sheet 5 of 8, in FIG. 5, under Reference Numeral 504, Line 1, delete "EMPLOYEEE(3)" and insert -- EMPLOYEE(3) --, therefor.

On sheet 6 of 8, in FIG. 6, under Reference Numeral 602, Line 1, delete "EMPLOYEEE(3)" and insert -- EMPLOYEE(3) --, therefor.

On sheet 6 of 8, in FIG. 6, under Reference Numeral 604, Line 1, delete "EMPLOYEEE(3)" and insert -- EMPLOYEE(3) --, therefor.

On sheet 6 of 8, in FIG. 6, under Reference Numeral 606, Line 1, delete "EMPLOYEEE(3)" and insert -- EMPLOYEE(3) --, therefor.

On sheet 6 of 8, in FIG. 6, under Reference Numeral 608, Line 1, delete "EMPLOYEEE(3)" and insert -- EMPLOYEE(3) --, therefor.

Signed and Sealed this
Tenth Day of July, 2018

Andrei Iancu
*Director of the United States Patent and Trademark Office*

CERTIFICATE OF CORRECTION (continued)
U.S. Pat. No. 9,842,294 B2

On sheet 6 of 8, in FIG. 6, under Reference Numeral 610, Line 1, delete "EMPLOYEEE(3)" and insert -- EMPLOYEE(3) --, therefor.

On sheet 7 of 8, in FIG. 7, under Reference Numeral 702, Line 1, delete "EMPLOYEEE(3)" and insert -- EMPLOYEE(3) --, therefor.

On sheet 7 of 8, in FIG. 7, under Reference Numeral 704, Line 1, delete "EMPLOYEEE(3)" and insert -- EMPLOYEE(3) --, therefor.

On sheet 7 of 8, in FIG. 7, under Reference Numeral 706, Line 1, delete "EMPLOYEEE(3)" and insert -- EMPLOYEE(3) --, therefor.

On sheet 7 of 8, in FIG. 7, under Reference Numeral 708, Line 1, delete "EMPLOYEEE(3)" and insert -- EMPLOYEE(3) --, therefor.